United States Patent

[11] 3,628,002

| [72] | Inventors | Earl E. Meese<br>Waynesboro;<br>James C. Kenyon, Lyndhurst, both of Va. |
|---|---|---|
| [21] | Appl. No. | 684,776 |
| [22] | Filed | Nov. 21, 1967 |
| [45] | Patented | Dec. 14, 1971 |
| [73] | Assignee | General Electric Company |

[54] ON-MACHINE INSPECTION SYSTEMS
14 Claims, 6 Drawing Figs.

[52] U.S. Cl. .................................................. 235/151.11,
90/13.9, 318/565, 318/572
[51] Int. Cl. ...................................................... G06f 15/46,
B23q 15/04
[50] Field of Search .................................... 235/151.11;
340/172.5; 33/174 PJ; 318/18 (20.100), 18
(20.200)

[56] References Cited
UNITED STATES PATENTS

| 3,135,055 | 6/1964 | Butler et al. | 235/151.11 X |
| 3,164,909 | 1/1965 | Rosenberg | 318/18 X |
| 3,206,857 | 9/1965 | Kaye | 33/174 |
| 3,226,833 | 1/1966 | Lemelson | 33/174 X |

OTHER REFERENCES
Measurement Made Easy from Metalworking Production January 1964 (1-22-64) pages 45 to 49

Primary Examiner—Eugene G. Botz
Assistant Examiner—Felix D. Gruber
Attorneys—Gerald R. Woods, Frank L. Neuhauser, Oscar B. Waddell, Joseph B. Forman and William S. Wolfe ABSTRACT: A system for inspecting work as part of the program of an automatically controlled machine tool wherein the deviation between the actual dimensions and the desired dimensions is stored and may be used to implement remachining operations.

INVENTORS
EARL E. MEESE
JAMES C. KENYON

ON-MACHINE INSPECTION SYSTEMS

CROSS-REFERENCES TO RELATED APPLICATIONS

Reference may be had to copending application Ser. No. 459,410 filed May 27, 1965 and assigned to the assignee of the present application. Although the present invention is not dependent upon the disclosure of the cited application, it may be referred to for further details of a basic automatic control system with which this invention may operate.

BACKGROUND OF THE INVENTION

This invention relates to on-machine inspection systems, and more particularly to such systems operating in conjunction with numerically controlled machine tools.

It is now recognized that it is economically and technically practical to provide an inspection system that is an integral part of automatic and numerically controlled machines. The machines that are used to automatically manufacture parts have all the degrees of freedom necessary to completely inspect the parts. Thus, where the machine is controlled in accordance with a program, it is feasible to include an inspection cycle during which the part is inspected in order to determine how closely it approaches the prescribed dimensions; having made such an inspection, it is then possible to remachine the part if necessary and/or to register the information concerning the deviation between the actual dimensions and those intended.

SUMMARY OF THE INVENTION

The on-machine inspection system disclosed herein is specifically arranged to cooperate with numerical positioning control systems or numerical contouring control systems which function under the control of a digitally presented program. In such systems, the equipment is selectively driven in each of the three directions of motion under the control of numerical data from standard punched tape, or the like. In addition, standard codes in the program are effective to initiate the performance of auxiliary operations such as tool changing, indexing, feed rate control, spindle speed, etc.

The present invention employs a three-dimensional probe of known type which can be mounted as a tool in the too position of the machine being used. As part of the total program of machine operation, an inspection operation will be called for, wherein the probe is inserted in the tool position. The machine is then positioned under the composite control of the regular control system and the output of the probe. While this composite control is in effect, the deviation between the dimensions called for by the program and the actual dimensions is measured and stored for possible future use. This information may be accumulated for a number of dimensions and subsequently used for remachining the part, if desired.

It is an object of the present invention to provide an improved on-machine inspection system adapted to function with existing numerical positioning control systems and numerical contouring control systems.

It is another object of the invention to provide an improved on-machine inspection system capable of automatically evaluating machine and control performance.

It is another object of the invention to provide an improved on-machine inspection system operative for machining to inspect a completed or partially completed part and capable of controlling the machine during subsequent remachining operations to remove the deviations between the desired dimensions and the actual dimensions.

It is still another object of the invention to provide a system for inspecting machined parts and storing tool offset data representative of the deviation between the desired part dimensions and those achieved during a particular machining situation.

It is yet another object of the invention to provide an improved on-machine inspection system utilizing a three-dimensional probe and adapted to drive the probe to a reference position and providing means for storing information representing the probe offset at that reference position.

The invention features the use of circuitry wherein the discriminator output normally used to drive the servosystem of a conventional numerical control system is replaced by the probe output when a specified level of probe or discriminator output is sensed; whereby additional machine movement is effected to position the machine at the desired location rather than at the programmed commanded position.

Another feature of the invention relates to an arrangement wherein the probe measures the deviation of a dimension during an inspection cycle, stores this deviation in a particular manner as a tool offset, and thereafter provides for the utilization of this stored data during remachining if required by the basic program.

Still another feature of the invention relates to an overdeflection protection arrangement for the probe, whereby the probe alternating current output is monitored any time there is relative motion between probe and machine and when the output exceeds a predetermined level the drive system is disabled.

The specific novel features of the invention are set forth with particularity in the appended claims. The invention itself, however, both as to its organization and method of operation, together with further advantages and features thereof, may best be understood by reference to the following description taken in conjunction with the accompanying drawings of an illustrative embodiment thereof.

DESCRIPTION OF THE PREFERRED EMBODIMENT

In order to properly understand the functioning of the present invention, one must appreciate the general operation of existing automatic machine tool controls with which the on-machine inspection system is adapted to cooperate. The numerical control data which determines the relative positioning of the equipment is presented to the control system in numerical form programmed on punched tape or the like. This numerical input data is routed to the appropriate subsections of the control system, wherein the control function is set into operation. In the system described with the illustrative embodiment of the invention, the input data is converted to a phase shifted signal having a discrete phase displacement with respect to a reference signal. In this form of representation, speed of movement is represented by the rate at which the phase of such a signal is varied. Although the invention is described in cooperation with a numerical positioning control system, the principles thereof are equally operative and compatible with numerical contouring control systems.

Figure 1:
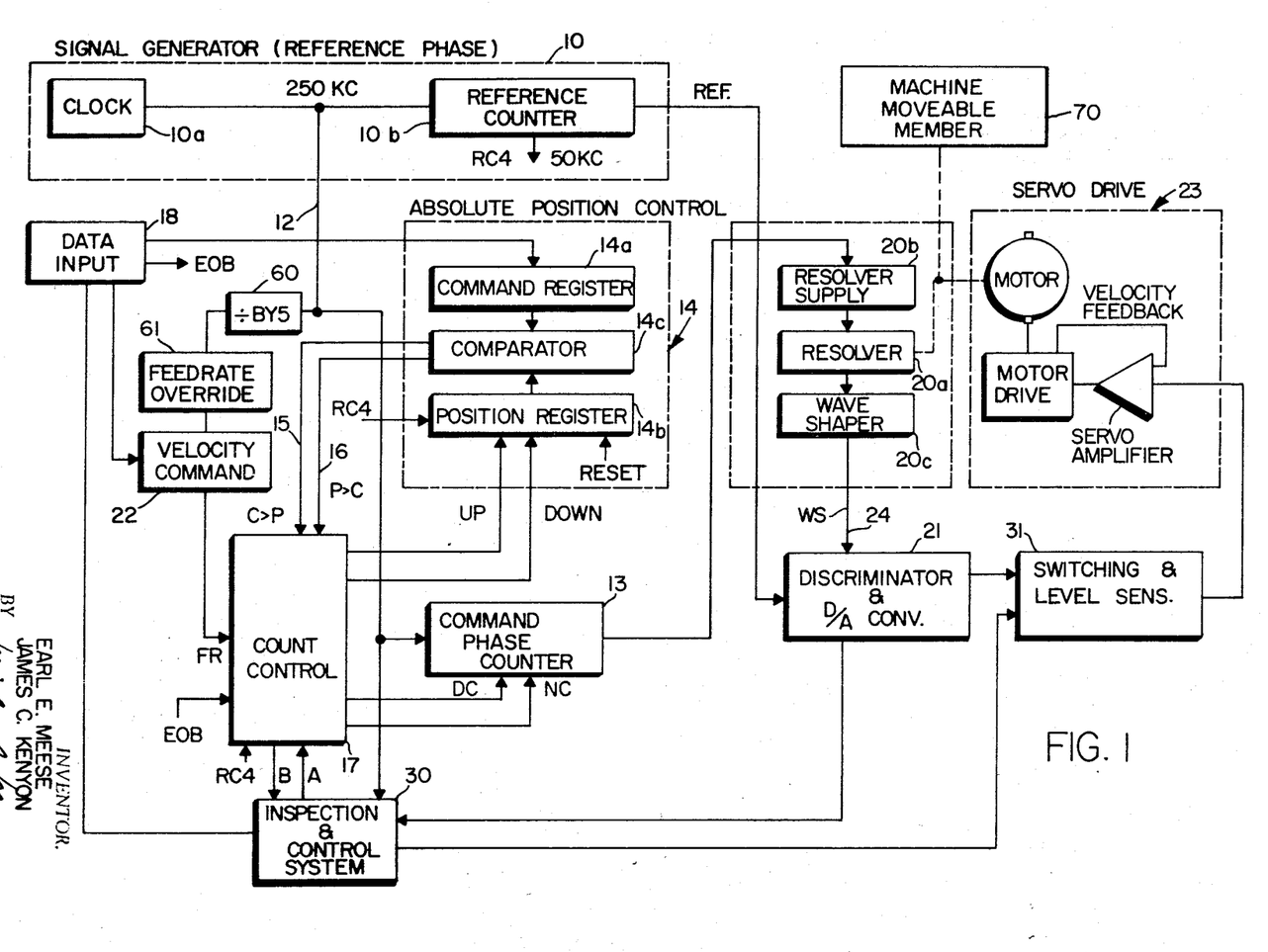
FIG. 1 is a general block schematic showing the basic components of a typical numerical positioning control system and the manner in which the present on-machine inspection system is interconnected thereto.

The numerical positioning control system illustrated generally in the block diagram of FIG. 1 is similar to that disclosed in copending application Ser. No. 459,410 filed by William P. Wilson on May 27, 1965, now U.S. Pat. No. 3,400,341. This general type of system has also been described in an article appearing in the May 1963 issue of Control Engineering entitled "Inside the Mark Century Numerical Controls." Reference to this copending application and article may be had for a more complete understanding of the machine control system itself. Still further, reference may be had to U.S. Pat. No. 3,173,001, which issued Mar. 9, 1965, to J. T. Evans, entitled "Automatic Control Apparatus" and is assigned to the assignee of the present application.

Referring to FIG. 1, it will be seen that in the basic control system a signal generator 10 is used to generate a reference phase signal. This generator comprises a clock 10a which produces a stable square-wave signal having a repetition rate of 250 kc. This signal is applied to a reference counter 10b which divides the 250-kc. clock signals by 1,000 and produces at the output thereof a reference signal of 250 cycles per second. In addition, an output is taken from reference counter 10b as indicated at RC4. The signal at this point is a 50-kc. wave comprising pulses of approximately 4 microseconds duration. In accordance with the conventions explained hereinafter, this means that the RC4 signal repetitively exhibits a logic 1 state for 4 microseconds and thereafter exhibits a logic 0 state for 16 microseconds.

The 250-kc. clock signal is also applied over lead 12 to the input of a command phase counter 13 which produces a train of square pulses at the rate of 250 cycles per second when the contents of the command register 14a are equal to the contents of the position register 14b. When equality is sensed by comparator 14c, conductors 15 and 16 exhibit a logic 0, and as thoroughly discussed in the cited references, under these conditions the command phase counter signal will be in phase with the reference phase signal.

The output of the command phase counter 13 is applied to the feedback control circuit 20 where it drives the resolver supply 20b which in turn is connected through resolver 20a to the wave shaper 20c. Thus, the output of the wave shaper, WS, is a square wave having a frequency of 250 cycles with a phase displacement relative to the reference signal that is commensurate to the difference between the actual position of the machine moveable element 70 and the commanded position. This output from 20c and the reference signal from 10 are fed to discriminator 21 to provide an analog voltage or error signal for driving the machine movable member 70 by the machine positioning motors to the command location.

Figure 6:
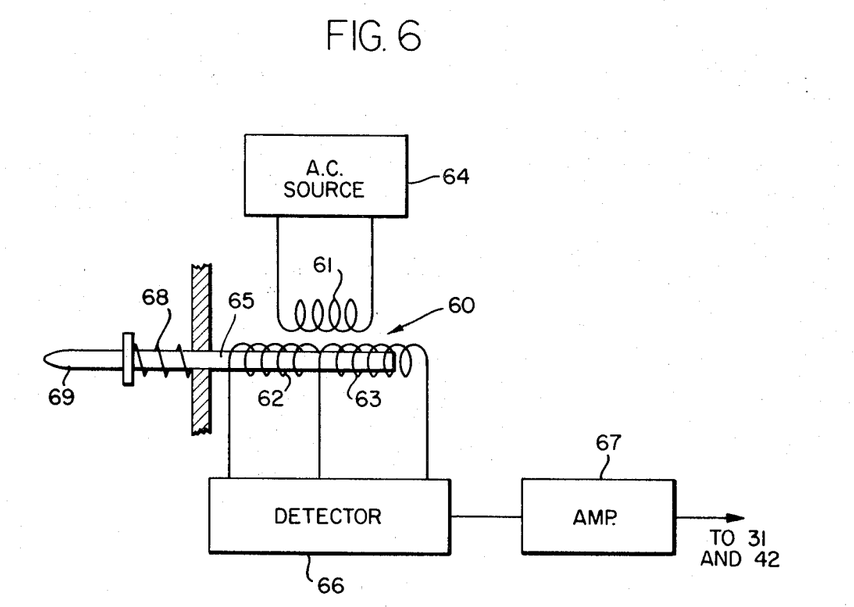
FIG. 6 illustrates one form of probe useful in describing the present invention.

The subject matter of the present invention is adapted to utilize this basic control system in order to provide on-machine inspection of the work piece. In order to do this, upon command from the input data program, the inspection and control system 30 calls for insertion of the probe on the machine moveable member, for example, in one of the tool positions and proceeds to perform the necessary operations. When the control system indicates that the machine has reached the commanded position, and the probe does not yield a null output, the probe takes over and by means of analog output voltages proportional to the amount of deviation of the probe position from its null, drives the machine until the probe output is nulled. At this point, the desired position has been achieved. Means are then provided for determining the deviation between the position to which the control had initially directed the machine and the point at which the probe has nulled. The determination as to whether the probe output or the discriminator output controls the servodrive is made via switching and level sensing unit 31. For further details of typical probe operation reference may be made to U.S. Pat. No. 3,164,909, dated Jan. 12, 1965 entitled "Automatic Gauging System" and issued to the common assignee. Briefly, such a probe or sensing transducer is carried by the machine moveable member, such as being inserted into the spindle in place of the drill or other cutting tool. This sensing transducer has a deflectable sensing means such as a feeler which can be oriented in each of the three directions, namely the X-, Y- or Z-axes. By providing relative movement between an object such as a workpiece and the machine moveable element, in this case the spindle carrying the probe, the part to be gauged is brought in contact with the feeler element of the probe or transducer. By selecting the orientation of the probe, the finished part may be gauged in the three dimensions. One such type of probe or transducer shown in FIG. 6 comprises a differential transformer 60 having a primary winding 61 and two secondary windings 62 and 63. As described in the aforementioned U.S. Pat. No. 3,164,909, the primary winding is excited from an AC source such as a 400-cycle oscillator 64. The secondary windings are differentially wound so that when the core 65 is inserted equally in these windings the amplitudes of the voltages induced in the secondary windings will be opposite and equal and a detector 66 will provide zero output voltage to an appropriate sensing transducer amplifier 67. The moveable core is biased by a spring 68 which is attached to a side of the housing of the device to cause the feeler 69 attached to one end of the core to extend whereby the core is unequally inserted in the two secondary windings. Thus in the absence of anything pushing the probe in, a voltage will be detected by detector 66 from the secondary windings having a given polarity. This voltage is applied to the sensing transducer amplifier to indicate the fact that an unbalance exists. When the probe end is pushed to insert the core further in the secondary windings, the amplitude of the detected voltage decreases. Such decrease can continue with further movement of the probe until it attains a zero or a null point. Thus a null or off-null signal indication is available from the detected and amplified output of the secondary windings associated with the probe.

Figure 2:
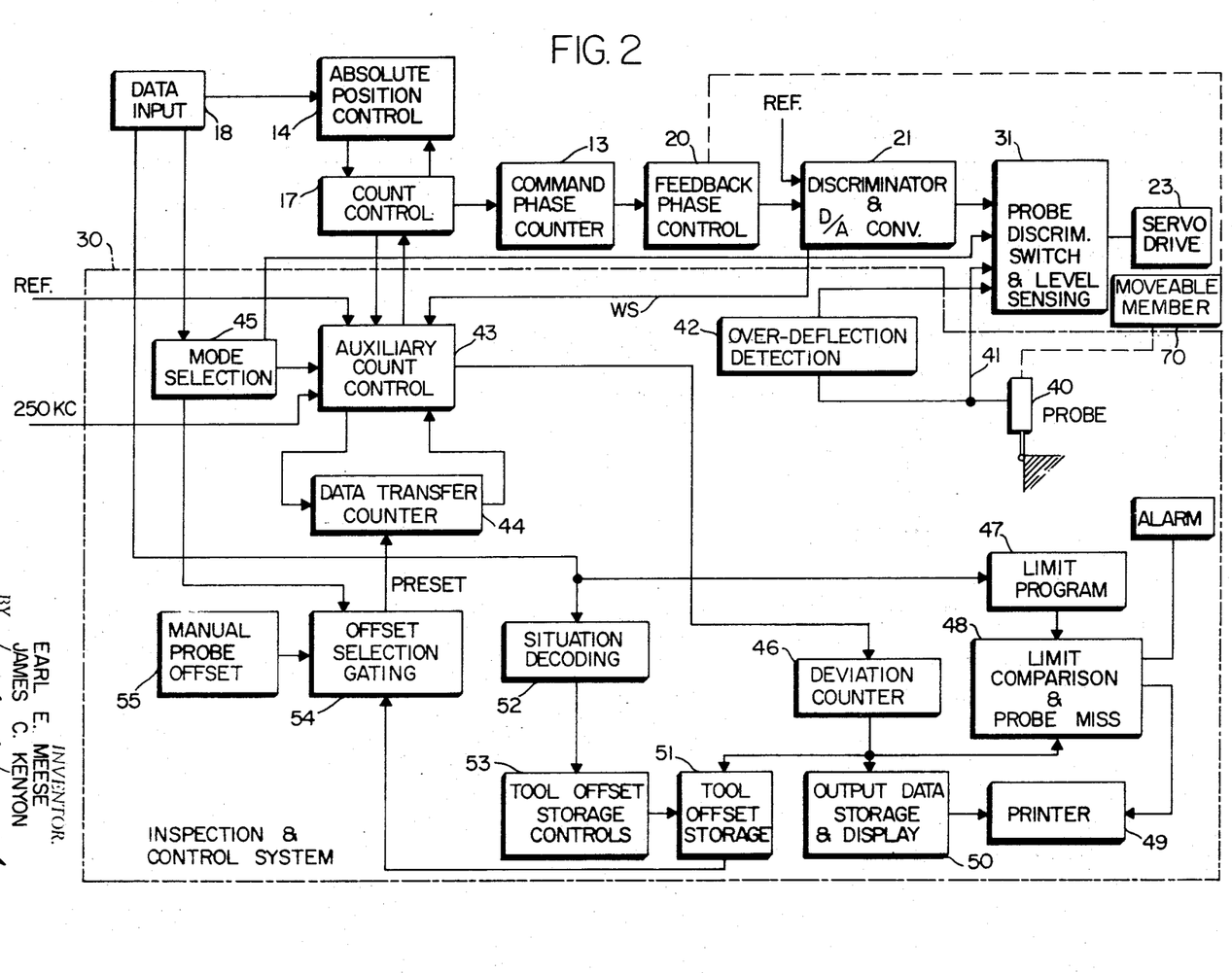
FIG. 2 is a more detailed block schematic showing the individual elements of the inspection and control system of the present invention.

Reference is now made to FIG. 2 in order to describe the specific operation of the probe and the manner in which it establishes control over the machine. In order to initiate on-machine inspection, a block of input data calls for insertion of the probe 40 in one of the tool positions on the machine. The preparatory functions for on-machine inspection are then determined in accordance with a number of control functions that are considered hereinafter.

First, it will be appreciated that the probe 40 itself should be calibrated to insure that the zero position thereof, relative to a commanded position, corresponds with a known reference point. In effect, the reference point may be on the machine, the work fixture, or the machined part. Such an established reference point will be known relative to the machine's coordinate axes and can be specified by the input tape program.

The control logic automatically drives the machine moveable member carrying the probe under the input data command to the specified reference point.

The probe produces an output signal proportional to the amount it is deflected from its null, thus, if the probe is driven to the commanded position by the machine moveable member and still registers a deflection, there is a deviation between the probe null and its indicated position that must be compensated for during subsequent inspection operations. When there is such a deviation, indicating the probe has not reached the commanded position the output of the probe provides an analog feedback signal to the control system via switching and level sensing unit 31 which initiates additional movement of the machine moveable element until the probe output is nulled. The difference between the commanded position and the actual position achieved when the probe output is nulled, is registered in digital form in deviation counter 46 (as explained hereinafter). This is read by the output data storage and display unit 50 and is used by the machine operator to manually insert a probe offset in manual probe offset registers 55. The manual probe offset 55 may, in fact, comprise a register controlled by thumbwheels. During subsequent inspection operations under the control of information in the tool offset storage registers 51, the data contained in the manual probe offset 55 is added or subtracted from information in the tool offset storage registers 51 prior to the presetting of the data transfer counter 44.

As will be understood, the output of discriminator 21 normally provides a pulsating direct current to the servoamplifier within the servo-drive 23. This current or error signal is proportional to the instantaneous difference between the commanded position and the actual moveable element machine position. When using probe 40 as a feedback control device, the input to the servoamplifier is switched at the probe-discriminator switching and level-sensing unit 31 from the discriminator output to the probe output. The switching is initiated upon sensing a specified level of probe or discriminator output, when operating in one of the inspection modes. That is, both discriminator and probe outputs are monitored and when either gets to a specified level, which in our particular embodiment is a given low level, the control of the servo is switched to the probe control.

In order to initiate a cycle of operations using the on-machine inspection system, appropriate commands are inserted in the input program. Typical commands would call for the following modes of operation: (1) inspect and proceed; (2) inspect and stop machine when reading is outside of prescribed limits; (3) inspect and store the deviation in automatic tool offset; and (4) remachine using designated automatic tool offset. These commands are implemented via gates in the mode selection circuit 45 and auxiliary count control 43.

When one of the inspection modes is called for, the machine is initially moved under control of the program data via discriminator 21 as previously noted and thereafter under the control of the output from probe 40. If the machine is stopped by the probe before it reaches the commanded position, it is considered that the deviation is "negative." If the machine motion proceeds beyond the commanded position before stopping, it is considered that the deviation is "positive." The sign of the deviation is obviously important because it determines whether or not the deviation data is to be added or subtracted from the command data during subsequent operations.

When the machine movement is stopped under probe control prior to coincidence of the data in command register 14a and position register 14b, the position register is modified by count pulses in the usual fashion by the basic control system until the registers are equal. Under these conditions the movement of the machine by the probe 40 output does not effect updating of the position register 14b. The aforementioned command signals from the data input 18 do the updating. Coincidence of the data in the command register 14a and in the position register 14b indicates the final position that the machine would have reached if it had been driven under the control of the discriminator 21 output. Accordingly, the coincidence stops the further application of pulses into the command phase counter 13 by the basic control system and there is no further output therefrom. Thus, the phase of the output of the command phase counter 13 represents the commanded position established by the program. On the other hand, the phase of the resolver feedback signal represents the actual position of the machine.

As explained later in connection with FIGS. 3 and 4, the count control circuits 17, 43 of the on-machine inspection system provide the necessary gating for developing a digital value representing the deviation between the phase of the commanded position and the actual position. Under the control of the gates in the circuit, the command phase counter 13 is counted following coincidence of the data in the command register 14a and position register 14b. Elements in the auxiliary count control circuit 43 compare the reference signal "REF" appearing at the output of reference counter 10b and the wave shaper 20c output signal "WS." A phase lead between the signals will result in a counting up of the command phase counter 13 and a phase lag will result in a counting down, until the phase difference between the signals represents less than 0.0001 inch. The number of pulses required to place the command phase counter output in phase with the wave shaper output represents the deviation.

In addition to controlling the counting of the command phase counter 13, the count control circuits 17, 43 gate counting pulses into deviation counter 46. Deviation counter 46 receives the same number of pulses as those applied to the command phase counter 13 accordingly presents a digital value representative of the deviation between the commanded position and the actual position of the machine. Still further, count pulses are fed via count control circuit 17 to the position register 14b in order to register therein a value representative of the actual position of the machine.

The information stored in the deviation counter can be used in a number of ways depending upon the selected mode of operation. First, it can simply be employed as an indication of the deviation and displayed in storage and display unit 50. It may also be compared with prescribed limits set forth in the program itself in order to determine whether or not the deviation from the commanded position is within acceptable limits. As illustrated in FIG. 2, the data input 18 supplies limit information to a limit program register 47 and this information is compared in comparator 48 with the data stored in deviation counter 46 The results of this comparison may then be supplied to a printer 49 for the presentation of a permanent record showing whether or not the deviation was within prescribed limits and the exact quantity thereof; or it may be used to initiate further machine operations.

The deviation information stored in deviation counter 46 may also be employed in order to carry out remachining of the part as a step in bringing it into conformity with desired dimensions. If remachining is contemplated, the output of deviation counter 46 is stored in a tool offset storage register 51. As the information is stored in this register it is encode in accordance with the particular situation involved in the inspection.

By storing in the tool offset register 51 only deviation data for dimensions which are outside prescribed limits, it is possible to use a register having fewer storage banks than the total number of dimensions for each particular workpiece. Furthermore, by storing data in this register based upon a particular machining situation, rather than upon deviation obtained through the use of a particular tool, it is possible to recall the offset information when the particular machining situation is again encountered. This is also particularly important because any one tool may produce a deviation from the commanded conditions for a number of reasons. For example, the same tool during subsequent machining operations may become worn or may move. Also, the tool may effect different machining in different portions of the work piece or when moving at different speeds or in different directions. This situation identification may be in the form of a discrete identifying code which identifies the tool, the axis, the direction of movement, etc.

It will be appreciated that at times the remachining cycle may be called for in the basic control program but skipped in the event that the dimensional limits were satisfied. Significant time is required each time the probe is placed in the tool holder. Accordingly, it is desirable when possible to make several measurements while the probe is in position. The decisions concerning the various deviations encountered during these measurements are made during the inspection operation and when necessary for particular situations, the data placed in the tool offset storage registers 51 for utilization later in a series of remachining operations. The situation identification code is used in the program both during the inspection cycle and during the subsequent remachining cycle.

During a remachining cycle, the information contained in the tool offset storage registers 51 is applied via offset selection gates 54 to preset a data transfer counter 44. Data transfer counter 44 controls the counting of pulses into the position register 14b in order to insure that when coincidence between the command and position registers occurs the machine will be in the desired position. Thereafter, the normal machine control functions are utilized in order to drive the machine with the associated tool to the desired position.

The illustrated system of inserting deviations into the tool offset storage registers 51 and the recall of these deviations when needed, permits a unique method for automatically calibrating the inspection system. As already explained, the system will be initially calibrated by the use of the manual probe offset information register 55. However, during subsequent operations, the amount of correction required to maintain calibration can be measured and compared to limits.

Where there is drift, or errors occur as a result of reinsertion of the probe 40 into the tool holder, corrections may be detected in this manner.

To effect automatic calibration, the control is programmed to inspect a precisely located calibration surface for each axis direction of the probe. Any deviation is an indication of the correction needed for proper calibration of the probe. This deviation is then entered into the tool offset registers 51 and identified as the necessary offset for the probe. This probe offset may be then called out and used each time the associated axis direction of the probe is involved. As in the case of dimensional limitations on the work pieces, the amount of correction permissible in the specific inspection cycles can be programmed and inserted in the limit program register 47 and the action to be taken if the correction exceeds permissible limits is determined by the inspection mode selected. Systems including a printer 49 would provide a printed record of the calibration corrections required and calibration on regular intervals would provide an indication of drift and perhaps indicate approaching failure.

Another aspect of the present invention concerns means for protecting the probe from damage. It will be appreciated that the probes are relatively delicate devices and that the forcing of the probe against hard surfaces could mechanically damage it. A relatively simple overdeflection detection circuit 42 is provided in the present system for monitoring the alternating current output of the probe 40 any time there is relative motion between the probe and the machine. Monitoring this output provides an indication whenever deflection is caused in any direction. When the alternating current output exceeds a predetermined level, the probe-discriminator switching and level-sensing circuit 31 switches the input to the servo-drive amplifier 23 to zero volts. This effects stopping of all motion and may be used to initiate an emergency stop condition in the control. In a known manner, the emergency stop can in turn remove hydraulic power and remove any further possibility of motion. Under all circumstances, the rate of travel while the probe is being used must be low enough to permit stopping the motion before the deflection thereof is sufficient to damage the probe.

Finally, it is possible that as a result of a gross programming error, the probe might never be deflected. In the event this happens, the machine will stop at the commanded position called for the usual control system and yet the workpiece will be out of tolerance and the error may not be detected. This condition can be avoided by registering how far the equipment travels under the control of the probe output after it should have attained its normal position. When the registers show a deviation in excess of a predetermined amount, for example 0.020 inches, an emergency stop would be initiated and the machine inspected to determine the cause of the excess deviation.

Figure 3:
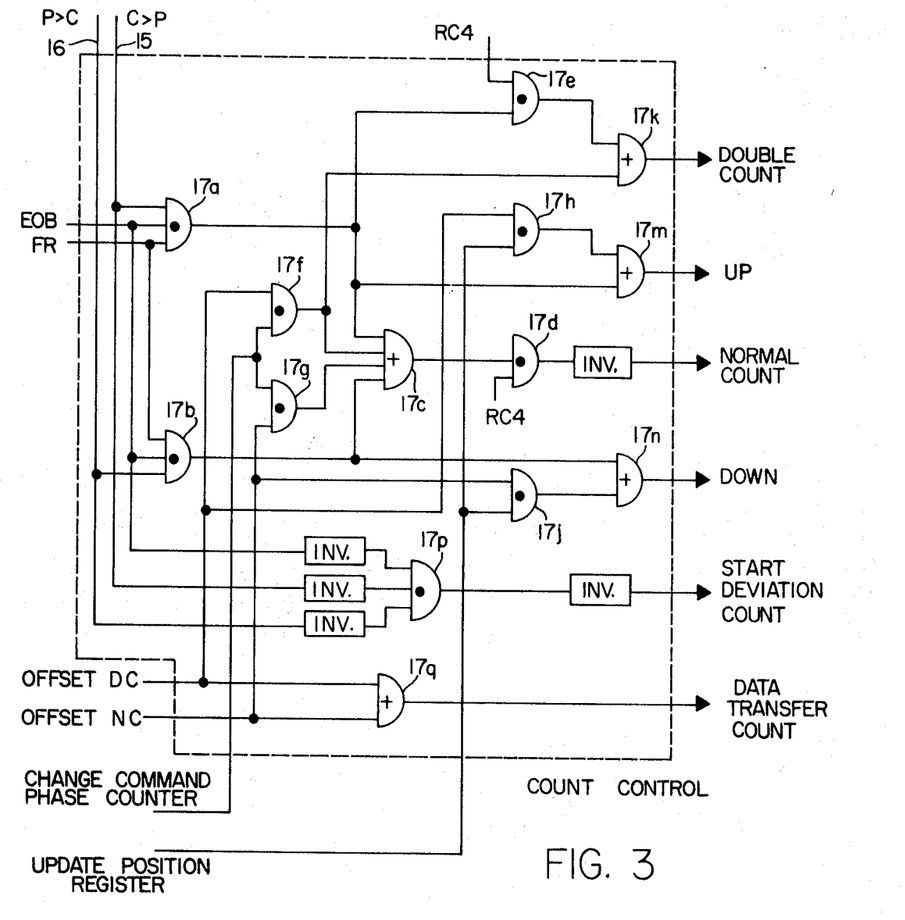
FIG. 3 is a logic schematic showing the Count Control circuitry of the illustrative embodiment.
Figure 4:
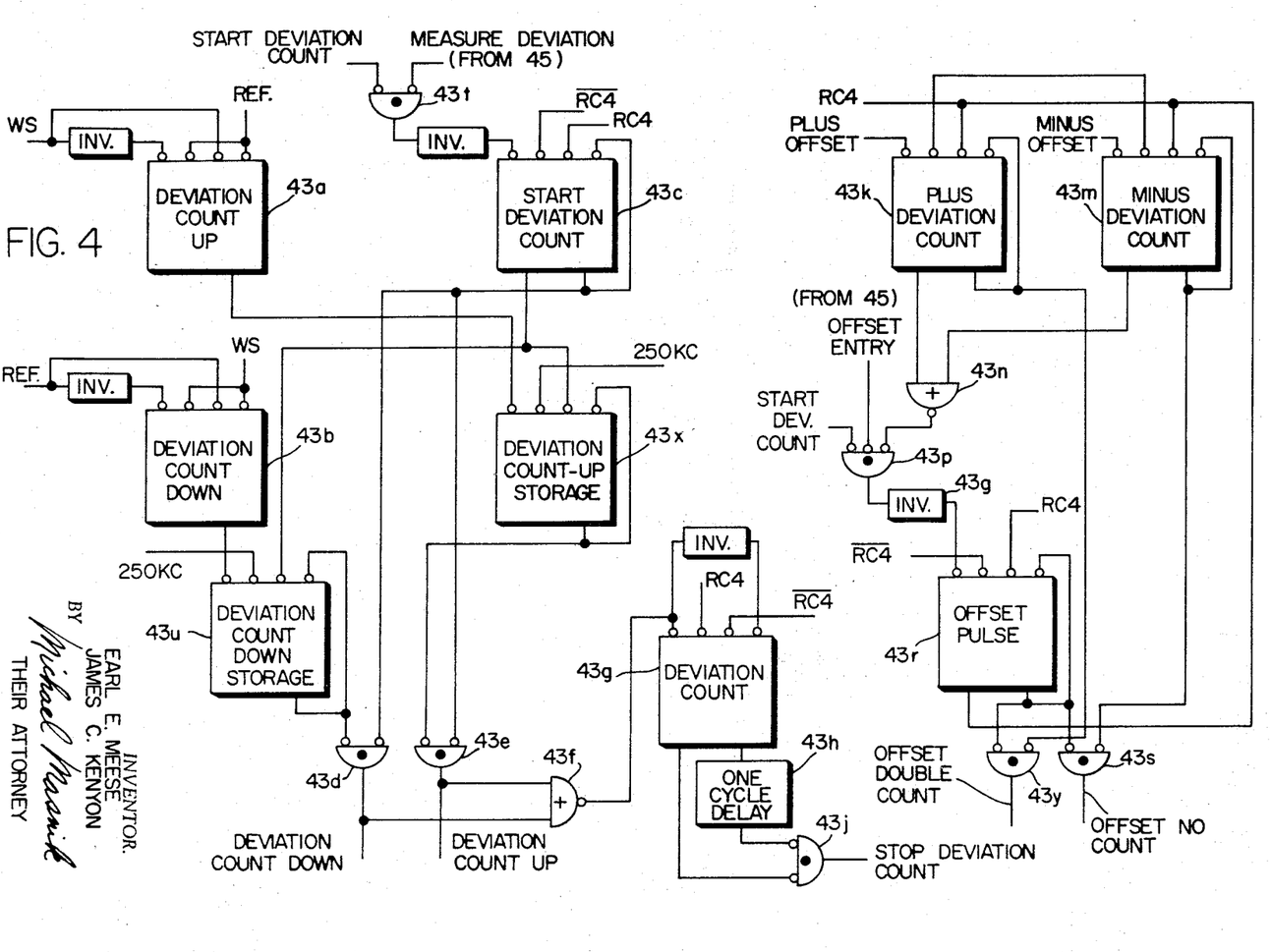
FIG. 4 is a logic schematic showing the principal portions of the Auxiliary Count Control circuit, of the illustrative embodiment.

For a more complete understanding of the manner in which the count control circuit 17 and auxiliary count control circuit 43 control the operation of the on-machine inspection system and the various registers within the control system itself, attention is directed to the logic schematics appearing as FIGS. 3 and 4.

Before discussing FIGS. 3 and 4 in detail, several circuit conventions will be explained. Logic circuitry is well understood and is used hereinafter to illustrate the arrangements for the count control and the auxiliary count control circuits. The convention adopted herein is that a logic value "0" applied on a lead means that a positive voltage is applied. The logic value "1" on the other hand, is represented by a zero or negative voltage.

In order to succinctly set forth the various circuit schematics, conventional symbols have been used to represent various logic and circuit functions. Any number of specific circuit configurations may be developed by those skilled in the art to perform the functions designated by the various circuit symbols. The voltages supplied to operate the circuits are, of course, dependent upon the specific components employed.

All digital logic circuits require devices to perform logic functions on the one hand, and storage or memory functions on the other. The logic functions in this system are performed by AND gates, OR gates, and NOR gates. The memory or storage functions are performed by bistable multivibrators or flip-flops.

An AND gate is illustrated by the element 17e appearing at the upper central portion of FIG. 3. The symbol for this type of gate contains a "dot" in accordance with conventional notation in Boolean algebra equations. This gate operates to provide an output if there is a signal on the first input lead and a signal on the second input lead.

An OR gate is illustrated by the element 17k appearing at the upper right portion of FIG. 3. The symbol for this type of gate contains a "plus" in accordance with conventional notation in Boolean algebra equations. This gate operates to provide an output if there is a signal on the first input lead or a signal on the second input lead.

NOR gates take two forms. By using an inverter at each input of an AND gate, one is able to develop a NOT AND gate whereby an output is produced when there is no input on the first input lead and no input on the second input lead. The symbol for this type of logic function is illustrated by element 43j appearing at the lower left of FIG. 4. In another form, one may use an OR gate and invert the output to develop an OR NOT gate. In this case, a signal on the first input lead or a signal on the second input lead will produce no output signal. In fact, the functioning of a NOT AND gate and an OR NOT gate will be found to produce identical results, and this is why they are both called NOR gates. The statement of operation may take the following form: if neither the first input nor the second input is equal to logic 1, the output is equal to logic 1.

Another convention used in this specification is illustrated by the cited NOT AND and OR NOT GATES. The little circle adjacent to the circuit symbol indicates that a signal inversion takes place at that point.

A further logic function is the operation of inversion. This may be carried out with a one input logic gate. In the accompanying drawings inverters are illustrated by a small box with the letters "INV" therein. Element 43q appearing at the lower right of FIG. 4 represents such an inverter.

It is often the case that the logic gates must handle more than two input variables. This is easily accomplished since two or more circuits may be placed in parallel to provide the required function. The parallel array may be increased considerably so that a large number of inputs may be arranged to perform the desired logic function. The overall system operation is not affected adversely by this paralleling of the circuits since each of the circuits may include a transistor amplifier, whereby appropriate potential and current values are readily maintained.

Figure 5:
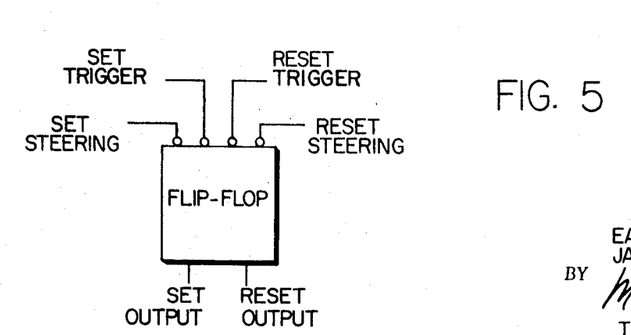
FIG. 5 illustrates the symbol used in the logic drawings to depict a multivibrator or flip-flop.

A typical multivibrator or flip-flop, used primarily for storage or memory, is shown symbolically in FIG. 5. In the operation of this flip-flop, a steering signal must first be applied to the steering input and shortly thereafter the triggering signal may be applied to condition the element. Thus, to set the flip-flop, a logic 0 must be applied to the Set Steering lead and thereafter a logic 0 must be applied to the Set Trigger lead. This will set the flip-flop and generate a logic 1 at the Set Output lead. Similar signals must be applied to the Reset Steering and Reset Trigger leads to reset the flip-flop.

Before proceeding with the detailed consideration of FIGS. 3 and 4, one other convention may be noted. In a number of instances, leads are designated in a functional manner by indicating the signal they carry. Thus, "RC4" adjacent to the Reset Trigger of flip-flop 43c in FIG. 4 indicates that the RC4 signal is applied over this lead. Furthermore, this indicates that the operative signal is a logic 1. A bar over the designation, e.g. $\overline{RC4}$, indicates that the operative signal is a logic 0.

The count control logic schematic shown in FIG. 3 is in essence a modified form of the count control circuit shown and described in connection with the aforecited copending patent application Ser. No. 459,410 filed May 27, 1965. As explained in that application, the lead 15 from comparator 14c has a logic 1 thereon when the value of the data in the command register exceeds the value of the data in the position register, and lead 16 has a logic 1 thereon when the value of the data in the command register is less than the value of the data in the position register. The feed rate signal FR is logic 1 when the machine is positioning and the end of block signal EOB is logic 1 when the command signal emanating from the data input source 17 has been stored in the command register 14a. Thus, under usual operation when the control signals on leads 15 and 16 are at logic 0 AND-gates 17a and 17b will not provide any output and the command phase counter 13a will operate at the same frequency as the reference counter 10b. Under these conditions, OR-gate 17c will have its output at logic 0 (assuming that AND-gates 17f, 17g associated with the on-machine inspection system have logic 0 outputs) and AND-gate 17d will not pass RC4 signals. As a result of the inverter on the output of AND-gate 17d, the normal count signal will be at logic 1 and the command phase counter 13a will, assuming that it started counting in synchronism with reference counter 10b, provide a pulse train on the output thereof which is in phase with the reference signal REF. In other words, the command phase counter 13 will count the clock signal in normal manner, i.e., it will count each clock pulse.

If it is now assumed that lead 15 is in a logic 1 state, indicating that the commanded position is greater than the actual position, AND-gate 17a will operate and its output will assume a logic 1. This in turn enables AND-gate 17e which permits the passage of signal RC4 via OR-gate 17k to the command phase counter, effecting double count operation. When lead 16 has a logic 1 thereon, AND-gate 17b operates and this in turn via OR-gate 17c causes blocking signals of logic 0 to appear at output of the inverter connected to AND gate 17d. These blocking signals have a repetition rate of 50 kc. and cause the command phase counter to count at a rate slower then that of the reference counter 10b.

The direction of the count in the position register 14b which takes place simultaneously, is also established by the count control circuit depending upon the output of AND-gates 17a and 17b, these outputs being applied via OR-gates 17m and 17n respectively, to the countup or countdown control leads of the position register.

Before considering the manner in which the count control circuit is modified in order to accommodate the present on-machine inspection system, attention is directed to FIG. 4 wherein essential portions of the auxiliary count control 43 are shown. The deviation measurement is stored in the deviation counter 46 under control of the circuitry appearing on the left of FIG. 4. It will be seen that this portion of the figure comprises six flip-flops 43a, 43b, 43c, 43g, 43u, and 43x. The deviation counter 46 will receive either countup or countdown pulses when an inspection mode is called for and the machine is under probe control. Thus, when the input data calls for measuring deviation, mode selector 45 produces a logic 0 on the input of NOR gate 43t. This signal plus the start deviation count signal will produce a logic 0 on the set steering input of start deviation count flip-flop 43c. The start deviation count signal is generated via AND gate 17p which appears in the count control circuit 17. When the end of block signal EOB is present and there is a logic 0 on leads 15 and 16 from comparator 14c, AND-gate 17p produces a logic 1 output which is inverted in order to provide a logic 0 at the input of NOR-gate 43t. With the resulting logic 0 on the set steering lead, the next occurrence of an $\overline{RC4}$ pulse will set the start deviation count flip-flop and a logic 0 will appear at the reset output thereof. This logic 0 is coupled back to the reset steering input and the subsequent RC4 signal applied to the reset trigger input will reset the flip-flop to provide a logic 1 at the reset output. As long as the logic 0 appears on the set steering lead of start deviation count flip-flop 43c, the flip-flop will recurrently change state as the RC4 signal changes state. Thus, logic 1 and logic 0 signals will alternately appear at the set and reset outputs thereof. The output from the reset output lead is applied to the input of NOR-gates 43d and 43e which provide countup or countdown pulses to the deviation counter 46 on individual leads. The particular lead on which the pulses are applied will determine in a conventional manner whether the deviation counter counts up or down.

It is desired to count-up the deviation counter 46 when the REF signal leads the wave shaper output WS and to count-down the deviation counter when the wave shaper output WS leads the REF signal. These conditions are established by deviation count up flip-flop 43a and deviation count down flip-flop 43b. The wave shaper output is inverted and applied to the set steering input of deviation countup flip-flop 43a, and the REF signal is inverted and applied to the set steering input of deviation countdown flip-flop 43b. Those signals are also directly applied to the reset trigger inputs of the respective flip-flops. In addition, the REF signal is applied to the set trigger and reset steering inputs of the deviation countup flip-flop 43a and the WS signal is applied to the same inputs of the deviation countdown flip-flop 43b. As a result of these connections, the deviation countup flip-flop 43a is set when the REF signal leads the WS signal and the countdown flip-flop 43b is set when the WS signal leads the REF signal.

Since these flip-flops 43a and 43b determine the direction of count for the deviation counter 46, and the start deviation count flip-flop 43c is supplying counting pulses, it is a relatively simple matter to direct the counting pulses to the correct input of the deviation counter. However, since the counting pulses appear at the RC4 rate of 50 kc., two additional flip-flops may be added to insure proper synchronization.

These additional flip-flops 43u and 43x are inserted in the reset output leads from the deviation countup and deviation countdown flip-flops 43a, 43b, respectively. These flip-flops are similarly connected as follows: the reset output leads from the associated flip-flip 43a, 43b are connected to their set steering inputs; the set output lead from the start deviation count flip-flop 43c is connected to their reset trigger inputs, the 250 kc. clock pulses are connected to their set trigger inputs; and their reset outputs are connected back to their reset steering inputs. These flip-flops 43u and 43x have been labeled deviation countdown storage an deviation countup storage, respectively.

The reset outputs of the last-mentioned flip-flops 43u and 43x are connected to the inputs of NOR gates 43d and 43e and therefor establish the supply of RC4 rate pulses to count the deviation counter 46.

When the deviation count is to stop as a result of having measured the deviation, the deviation count flip-flop 43g is reset and remains reset. The set steering input of deviation count flip-flop 43g is supplied with a signal from the outputs of NOR-gates 43d and 43e via NOR-gate 43f and the output of NOR-gates 43f is also supplied to the reset steering input via an inverter. RC4 pulses are supplied to the set trigger and $\overline{RC4}$ pulses are supplied to the reset trigger of flip-flop 43g. Accordingly the flip-flop will switch at the RC4 rate. A stop deviation count signal will be generated at NOR-gate 43j when the flip-flop no longer changes state at the RC4 rate. This is accomplished by circuit 43h which inverts the reset output of flip-flop 43g and introduces a 20-microsecond time delay. Normally, one of the inputs presented to NOR gate 43j will be at logic 1 because of this time delay. Only when the switching of the flip-flop is no longer at an RC4 rate will both inputs become logic 0. At this time, a stop deviation count signal of logic 1 will appear at the output of NOR-gate 43j.

The above discussion has described how the deviation counter 46 is controlled. Under a mode of operation requiring use of the offset information to change the command phase counter 13 and update the position register, the portions of the auxiliary count control circuit shown on the right of FIG. 4 and the parts of the count control circuit in FIG. 3 now to be discussed, become operative.

Considering first FIG. 4, it will be seen that the count pulses which are supplied by the inspection system to adjust the command phase counter 13, the position register 14b, and the data transfer counter, are controlled by a plus deviation count flip-flop 43k and a minus deviation count flip-flop 43m. A logic 0 is applied to the set steering input of either of these flip-flops depending upon the sign of the stored offset. Subsequent occurrence of the $\overline{RC4}$ signal sets the appropriate deviation count flip-flop 43k or 43m and provides a logic 1 at the set output thereof. This logic 1 is applied via NOR-gate 43n to one input of a NOR-gate 43p. Another input of NOR-gate 43p is the "start deviation count" signal developed in the manner previously described. A third input of NOR-gate 43p is supplied from the mode selection circuit 45 when offset information is to be entered. The output of NOR-gate 43p passes through an inverter 43q to the set steering lead of offset pulse flip-flop 43r. The set trigger input of this flip-flop is supplied by $\overline{RC4}$ pulses and the reset trigger input is supplied by RC4 pulses. The reset steering input is connected to the reset output.

When offset pulse flip-flop 43r is set, a logic 1 signal appears at its set output and is applied to the offset double count lead which goes to several portions of the system via the count control circuit to control the operation of the data transfer counter, the position register, and the command phase counter. As noted, the reset output of offset pulse flip-flop 43r is coupled to its reset steering input. Therefore, when in a set condition the reset steering input has a logic 0 applied thereto. Accordingly, upon occurrence of the next RC4 signal on the reset trigger input the offset pulse flip-flop 43r is reset. The consequent occurrence of a logic 0 at the set output of offset pulse flip-flop 43r is applied to the reset trigger input of the deviation count flip-flops 43k and 43m. Thus, whichever of these flip-flops were set previously they will now be reset. This resetting results in the presentation of logic 0 at both inputs of NOR-gate 43n and this causes a generation of a logic 1 at the output thereof. The logic 1 is applied to the input of NOR gate 43p generating a logic 0 output which is inverted and applied to the set steering input of offset pulse flip-flop 43r. Obviously, no change in state of the offset pulse flip-flop is caused thereby.

The next appearing $\overline{RC4}$ pulse on the set trigger input of the plus or minus deviation count flip-flop 43k or 43m having its set steering lead energized, will again set that flip-flop and the above described sequence of operations will take place. It is thus seen that under these conditions the output of the offset pulse flip-flop will be repetitively energized at one-half the RC4 repetition rate. In order to produce the offset double count signal, NOR-gate 43y is provided. This gate provides a logic 1 output when both the plus deviation count flip-flop 43k and the offset pulse flip-flop 43r are set. In order to produce the offset NO count signal, NOR-gate gate 43s is provided. This gate provides a logic 1 output when both the minus deviation count flip-flop 43m and the offset pulse flip-flop 43r are set. In order to produce an offset NO count signal, NOR-gate 43s is provided.

Having now explained the manner in which the offset double count and offset NO count signals are generated, attention is redirected to FIG. 3. The offset double count and the offset NO count signals are introduced at the lower left of the figure to AND-gates 17f, 17g, 17h and 17j, and also to the two inputs of OR-gate 17q. Considering first the operation of these signals when they are applied to AND-gates 17f and 17g, it will be seen that the other input to each of these gates is a change command phase counter signal from the mode selection 45 via the auxiliary count control 43. When the change command phase counter signal appears and the offset double count signal from NOR gate 43y is generated, the offset double count signals appearing at the repetition rate of one-half RC4 are passed through AND-gate 17f and OR-gate 17c to be applied via gate 17b and the inverter to block the normal count of the command phase counter 13 as described previously in connection with usual control operation. As in the case of the normal control system operation, the offset double count signal is also operative via OR gate 17k to control double counting of the command phase counter.

In the event that there is to be no count of the command phase counter 13, the offset NO count output from NOR-gate 43s in FIG. 4 applies a logic 1 to AND-gate 17g in FIG. 3 thereby enabling this gate. The offset NO count lead is connected via AND-gate 17g, OR-gate 17c, AND-gate 17d and the inverter on the output thereof, to the normal count lead which inhibits the counting of the command phase counter 13. In addition, the offset double count signals and offset NO count signals are applied via gates 17h, 17m, 17j, and 17n to the up and down count inputs of the position register 14b. Considering the offset double count signal treatment as typical, it will be seen that it is applied via AND-gate 17h and OR-gate 17m to the up-count input of the position register. AND-gate 17h is enabled by the generation of an update position register signal from the mode selection 45 via the auxiliary count control circuit 43.

There has now been described an on-machine inspection system operative in conjunction with a particular numerical positioning control system to provide for automatic self-calibration and inspection of parts machined in accordance with predetermined programs. As a result of a programmed inspection cycle, the machine can be reoperated to remachine the parts and eliminate previously existing dimensional inaccuracies; and the inspection data may be furnished in printed form. Although specific circuit arrangements have been proposed for accomplishing the desired objectives of the invention, it is understood that modifications thereof will be evident to those skilled in the art. In particular, it will be apparent that the principles of this invention are also applicable for use in conjunction with numerical contouring control systems. Any modifications which fall within the scope of the appended claims are intended to be covered thereby.

What is claimed as new and desired to be secured by Letters Patent of the United States is:

1. Apparatus for controlling the relative positioning of a machine moveable member and a workpiece in accordance with a desired mode of operation in response to input data, comprising means responsive to said input data to direct the mode of operation desired, means responsive to said input data to move said machine moveable member toward a commanded position, means for producing an error signal indicating the difference between said commanded position and the actual position of said machine moveable member, probe means with deflectable sensing means mounted for movement with said machine moveable member toward said commanded position, said probe means providing an output signal commensurate with the amount its sensing means is deflected from a prescribed null position by said object, switching means operative in response to said error signal indicating that the moveable member has substantially reached a commanded position or to said probe output signal having substantially reached a null position whichever first occurs to effect further movement of the machine moveable member in response to the output of said probe means until the probe means null position is attained, and means for storing data to provide stored data representing the deviation between the position represented by said commanded position and the actual machine position effected responsive to the output of said probe means.

2. Apparatus as defined in claim 1, including means operative in response to input data identifying a predetermined mode of operation to initiate repositioning of the machine moveable member as directed by said command data in combination with said stored data.

3. An on-machine inspection system as defined in claim 1, wherein said means for directing the mode of operation comprises means for effecting a plurality of inspection cycles in response to preselected input codes and means for identifying with the particular inspection cycle the respective stored deviation data representing the deviations between positions represented by command data and those effected under probe means control.

4. An on-machine inspection system as defined in claim 3, wherein the input data includes limit information indicating permissible limits of deviation, means for comparing said limit information with said data representing deviations, and means to effect storage of said data only when the deviation exceeds said permissible limits.

5. Apparatus as defined in claim 4, including means operative in response to preselected input codes to initiate remachining of a part under control of further command data in combination with the stored data representing deviations.

6. Apparatus as defined in claim 1, including means responsive to an output signal from the probe means and operative when the output thereof exceeds a predetermined limit to terminate further machine movement.

7. Apparatus as defined in claim 1, including further means operative to terminate machine movement after the machine has attained the commanded position and when the deviation between the commanded position and the actual position exceeds a predetermined value.

8. Apparatus for controlling the relative position of two objects in response to input data wherein one of said objects is a machine moveable member adapted to perform operations on the other object, means responsive to said input data to direct the mode of operation desired, means responsive to said input data to move said machine moveable member toward a commanded position, means for providing an error signal indicating the difference between said commanded position and the actual position of said machine moveable member, probe means mounted on one of said objects for sensing the relative position of said objects to provide sensing signals, switching means operative in response to said error signal indicating that said moveable member has substantially reached a commanded position or said sensing signals having substantially reached a predetermined value whichever event first occurs to switch control from said input data to said sensing signals, and thereafter to respond to said sensing signals to effect further relative positioning of said objects until said sensing signals have reached a given value, and utilization means responsive to said sensing signals at the instant of said switching and to said sensing signals having reached said given value.

9. A method of controlling the machining of a part by a tool on a machine moveable member comprising the steps of first machining said part in response to command data by moving said member with respect to said part, repositioning the moveable member under control of command data to sense the deviation between each position prescribed by the command data and the actual position of the part after first machining, generating data representing said sensed deviation, providing a discrete code identifying the particular machining situation encompassed by the associated command data, storing said data representing said deviation along with said discrete code identifying the particular machining situation encompassed by the associated command data to provide stored data, and remachining said part under control of further command data in combination with the stored data representing the deviation detected for each corresponding machining situation.

10. The method defined in claim 9, including the step of selectively comparing said data representing deviations with prescribed limits and storing the data representing said deviation only when it exceeds said limits.

11. The method defined in claim 9, wherein said sensing of deviation comprises driving the machine moveable member under control of said command data until the position represented by said command data is substantially attained, sensing the position of said part to provide a sensing signal and thereafter driving the machine under control of said sensing signal, and generating a signal representing the distance traversed by the machine moveable member while under control of said sensing signal.

12. The method defined in claim 9, wherein said sensing of deviation comprises driving the machine moveable member under control of said command data and sensing the position of said part and thereafter generating a signal representing the deviation between the position represented by the command data and the actual position of the member as sensed.

13. Apparatus for controlling the machining of a part by a machine moveable member comprising means for moving said member for predetermined distances along desired coordinate axes, a positional transducer for indicating the position of said member along each of said coordinate axes from a reference position, a feeler transducer providing an output signal having a given value until a part is contacted thereby, and then an output signal which progressively changes to a different value as the transducer progressively engages said part, means for supporting said feeler transducer by said member, means responsive to applied commanded position data for positioning said member and supported transducer, means for producing an error signal indicating the difference between said commanded position and the actual position of said machine moveable member, means responsive to said error signal indicating that said member has reached said commanded position to effect further positioning of said member and transducer in response to said transducer output signal, until said transducer output signal attains said different value, means for storing data representing the deviation between the position indicated by said different positional transducers at the different value condition of said transducer output signal and the condition corresponding to said commanded position, and means for further machining said part under control of further applied commanded position data in combination with said stored deviation data.

14. Apparatus for controlling the machining of a part by a machine moveable member comprising means for moving said member for predetermined distances along desired coordinate axes, a positional transducer for indicating the position of said member along each of said coordinate axes from a reference position, a sensing transducer providing an output signal having a first value until a part is remotely detected thereby, and then an output signal which changes to a second value as a function of the distance separating said transducer and part, means for supporting said feeler transducer by said member, means responsive to applied commanded position data for positioning said member and supported transducer, means responsive to said positional transducers indicating said member has reached said commanded position or said sensing transducer providing an output signal having a value representing a predetermined distance between the distances represented by said first and second values, whichever event first occurs, to effect further positioning of said member and transducer in response to said transducer output signal, until said transducer output signal attains said second value, means for storing data representing the deviation between the position indicated by said different positional transducers at the different value condition of said transducer output signal and the condition corresponding to said commanded position, and means for further machining said part under control of further applied commanded position data in combination with said stored deviation data.

* * * * *